Nov. 11, 1952 A. E. MATHEY 2,617,303
COMBINED SIGNALING AND GAUGING UNIT
Filed Feb. 14, 1950 2 SHEETS—SHEET 1

Inventor:
A. Edward Mathey,
by Chudley Chittick
Attorney

Nov. 11, 1952      A. E. MATHEY      2,617,303
COMBINED SIGNALING AND GAUGING UNIT
Filed Feb. 14, 1950      2 SHEETS—SHEET 2
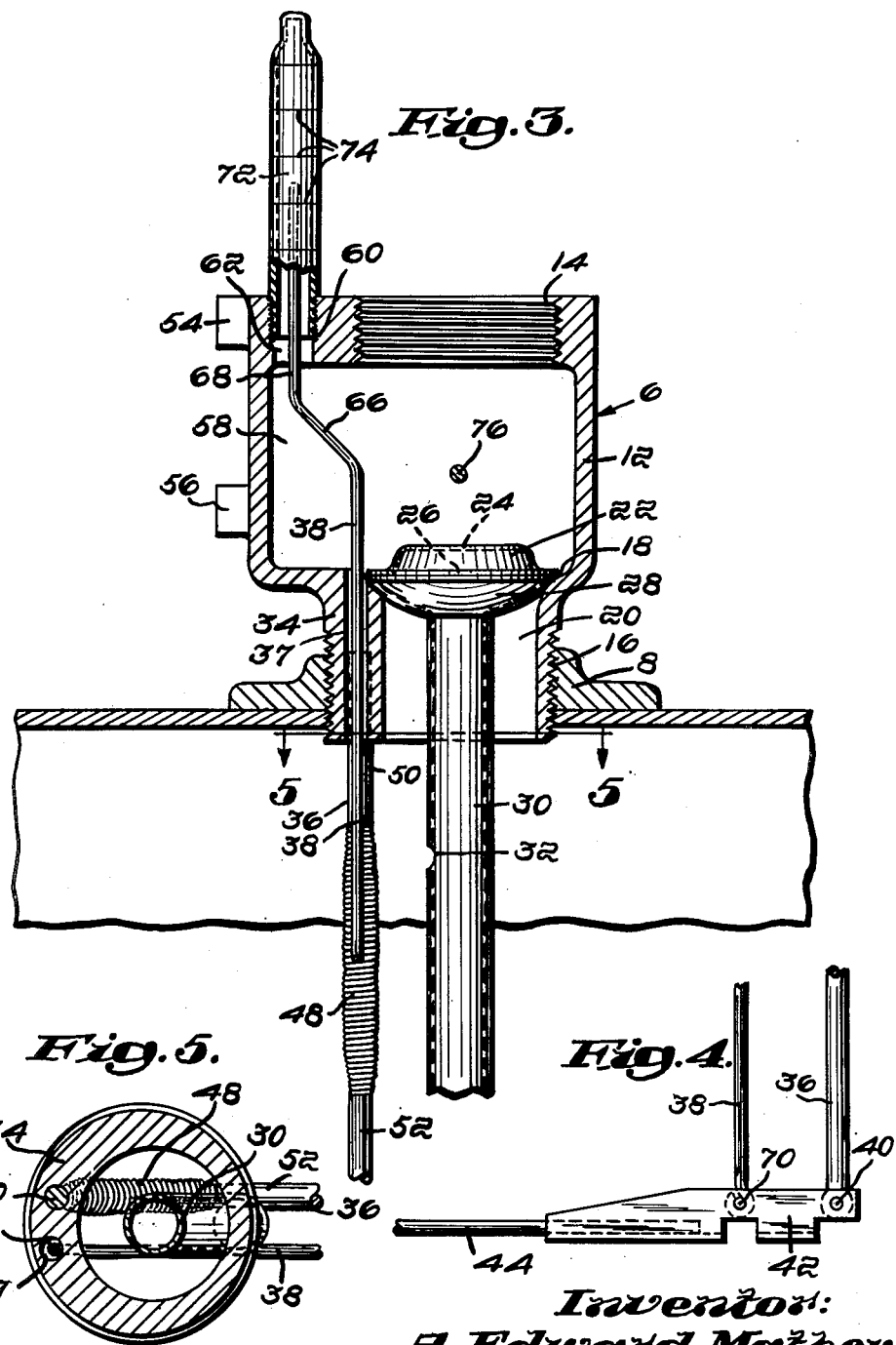
Inventor:
A. Edward Mathey,
by Yardley Chittick
Attorney Patented Nov. 11, 1952

2,617,303

UNITED STATES PATENT OFFICE 2,617,303

COMBINED SIGNALING AND GAUGING UNIT

Alcide Edward Mathey, Allston, Boston, Mass., assignor to Scully Signal Company, Cambridge, Mass., a corporation Application February 14, 1950, Serial No. 144,125

3 Claims. (Cl. 73—317)

This invention relates to a combination gauge and signaling device for use with closed tanks for liquids.

The invention has been particularly designed for use with the oval shaped tank commonly used with household heating equipment. Such tanks are customarily of about 275-gallons capacity, and may be positioned either vertically or horizontally. It will be understood, however, that the invention is not limited in its use to a household fuel oil tank but may, of course, be used with any type of tank where it would be applicable.

In the conventional installation, the tank is provided with a fill pipe through which the liquid enters and a vent pipe through which the displaced gases are vented to the atmosphere. As it is desirable to know when the tank has become substantially full during the filling operation and also to be able to determine the amount of fuel in the tank at any given time either during filling or thereafter, it has been customary heretofore to position an audible signaling device in the vent pipe so that an audible signal will be given at a predetermined point. In a separate opening in the tank top, it has heretofore also been customary to position a liquid level gauge. Such gauges are well known in this industry. One type comprises a swinging float arm connected to an indicator rod which extends through and above the tank top to a visible position and is adapted to move an amount proportional to the movement of the swinging arm. In this way, an approximate indication is given as to the level of oil in the tank at any time.

In the co-pending application of Scully and Mathey, Ser. No. 83,345, filed March 25, 1945, is disclosed and claimed a new combined signaling and gauging unit in which the audible signaling device and the liquid level gauge are combined in a single unit. The present invention constitutes an improvement on the invention of the aforesaid application.

One of the disadvantages appearing in the installation, in a vertically positioned tank, of a gauge having a conventional float arm in which the housing supporting the several elements must be screwed into the tank top, is the impossibility of screwing the housing into position when the tank is, more or less, half full. This difficulty is caused by the fact that the swinging float arm, in practically every case, is longer than half the width of the tank. Hence, when the gauge housing and the depending supporting arm that carries the float arm are rotated with the tank about half full, the float arm will engage the side of the tank and stop further rotation. Thus, when the liquid level is between determinable limits, it is impossible to screw the housing into the tank unless the float arm is in some manner held in up or down position. This, in practice, has proved to be somewhat difficult and time consuming. The present invention avoids this difficulty.

As will be explained more fully hereinafter, the vertical support arm that carries the swinging float arm and indicating rod actuated by the float arm, is constructed in a novel manner which permits the support arm and indicating rod to be deflected laterally as the end of the float arm engages the side of the tank during the insertion operation. Thus, it becomes possible to install the combined signaling and gauging unit in the tank, regardless of the liquid level therein, by merely screwing the housing into the threaded opening in the top of the tank.

The foregoing objects of the invention will become more apparent as the description proceeds with the aid of the accompanying drawings in which:

Fig. 3 is a detailed sectional elevation of the combined signaling and gauging unit showing the construction of the flexible vertical support in greater detail.

Fig. 4 is an enlarged detail of the hinge structure of the float arm and indicating rod.

Fig. 5 is a section on the line 5—5 of Fig. 3 with the support rod and the indicating rod in the deflected positions shown in Fig. 1.

Figure 1:
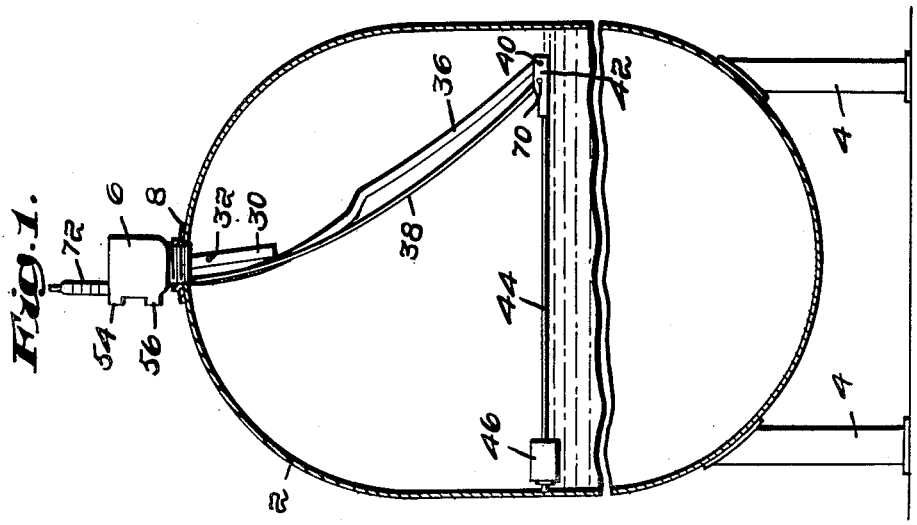
Fig. 1 is a vertical cross section of a tank showing the signaling and gauging unit in the crosswise position it will repeatedly assume during installation as the housing is screwed into the tank top. The tank is slightly more than half full.

Referring to Fig. 1, there is shown in cross-section a conventional fuel oil tank 2 mounted on legs 4. The tank is broken away in part to save space in the drawings.

Figure 2:
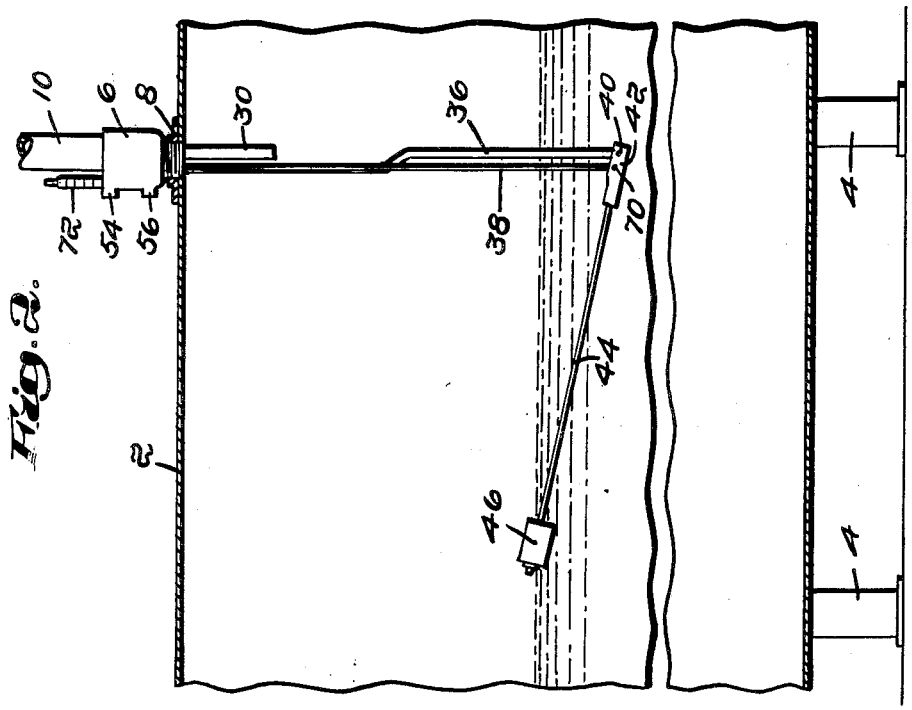
Fig. 2 is a vertical longitudinal cross-section of the tank broken away in part and showing the final position of the unit after installation has been completed. The vent pipe has been attached to the housing.

Fig. 2 is a vertical sectional elevation of the same tank with the ends broken away. In Fig. 1, the combined gauge and signaling unit indicated at 6 is in the process of being screwed into position in the vent opening 8, while in Fig. 2 the assembly 6 is in final installed position, and the vent pipe 10 has been connected thereto.

An enlarged cross-section detailed view of the signaling unit 6 is shown in Fig. 3. The unit comprises a tubular housing 12 internally threaded at the top at 14 and externally threaded at the bottom at 16. The bottom threads are adapted to engage the female threads of the vent opening 8, while the upper threads 14 are adapted to engage the male threads on the end of vent pipe 10.

In the interior of the housing 12 is a circular seat 18 at the upper end of passage 20. A conventional button type whistle 22 having central aligned openings 24 and 26 is carried by a supporting element 28 which rests on the seat 18, thus blocking the passage 20.

An intrusion tube 30 in series with the openings 24 and 26 extends downwardly from the body 28 with its lower end terminating at the point at which it is desired to give a signal as the rising liquid in the tank reaches that point. In the side of intrusion tube 30 is an open vent 32 which permits continued flow of gas through the upper portion of the intrusion tube and the whistle after the lower end of the intrusion tube has been trapped by the rising liquid.

As can be seen in Fig. 5, the lower extension of housing 12 has a somewhat thickened area at the left side as at 34 to provide means for mounting a supporting rod 36 and for a passage 37 therethrough for an indicating rod 38.

The supporting rod 36 is securely affixed to the thickened extension 34 against rotational and longitudinal movement. It extends downwardly therefrom to terminate in hinged relation at 40 (see Fig. 4) with a lever 42 which in turn has extending therefrom a float rod 44. The float rod has at or close to its end a conventional float 46 which is customarily made of cork treated on its surface with a material that will render it impervious to the liquid in the tank.

The supporting rod 36 is constructed to be flexible in a lateral direction while retaining tortional characteristics which will resist twisting to a substantial extent. Thus, when the housing 12 is rotated and the end of the float rod 44 comes in contact with one side, the continued turning of housing 12 will result in the development of sufficient pressure between the end of the float rod and the side of the tank to force the supporting rod 36 laterally as shown in Fig. 1 so that the end of the float rod can continue its movement along the side of the tank as the housing rotation is continued. Thus, the lateral flexibility of supporting rod 36 combined with substantial resistance to twisting makes it possible to screw the unit into the tank top regardless of the level of the liquid in the tank.

One construction of the supporting rod 36 which has been found suitable to provide the required characteristic is that shown in Figs. 1 and 3. Here a tightly coiled spring 48 has been inserted between the upper and lower portions of the supporting rod. The upper portion 50 is welded or otherwise securely affixed to the upper end of spring 48, and the lower portion 52 is similarly secured to the lower end of spring 48. Since spring 48 has been tightly coiled and the individual coils lie against each other, rotation of the upper portion 50 will result in similar rotation of the lower portion 52 with only a small angular lag. The lateral flexibility of spring 48 is considerable so that the supporting rod may easily assume the maximum deflected position shown in Fig. 1.

It should be pointed out that the hinge 40 is of sufficient rigidity and strength to transmit the force applied without danger of damaging the hinge action between supporting rod 36 and float rod 44.

On the side of the housing 12 are indicating tabs 54 and 56. These tabs extend in the direction normally assumed by float rod 44 so that the installation may be completed with the float rod extending longitudinally of the tank, in which position it will be free to move up and down with the changing liquid level without possibility of hitting the tank sides.

Housing 12 is offset in part to provide an inner offset area 58. Through the top of the housing at 60 above the offset area is an opening 62, and at the lower side of the offset area is the other smaller opening 37 in the thickened extension 34. Through these two openings extends the upper part of the indicating rod 38 which is offset at 66 so that the upper part 68 may pass freely through opening 62. The lower end of indicating rod 38 is in hinged connection at 70 with the lever 42 as can be seen in Figs. 1, 2, and 4. Obviously, vertical swinging movement of float rod 44 will produce a corresponding proportional vertical movement of indicating rod 38. The upper end 68 of the indicating rod is encased in a tubular housing 72 having markings thereon as at 74 for giving an indication of the existing liquid level in the tank.

Indicating rod 38 is made of thin flexible material so that it will offer but little additional resistance to the lateral deflection of rod 36 as housing 12 is rotated during installation. The extent of the bending suffered by indicating rod 38 will be within its elastic limit so that upon return of supporting rod 36 to normal vertical position, indicating rod 38 will likewise resume its normal position.

During installation, the lateral deflection of the supporting rod 36 and indicating rod 38 may bring them into contact with intrusion tube 30, but since this tube is carried by body 28 in a manner which permits it to swing on its seat 18, the tube may be readily deflected as indicated in Figs. 1 and 5 without in any way interfering with the installation. When the installation is complete with the parts as shown in Fig. 2, intrusion tube 30 will hang in its normal vertical position.

The procedure followed to install the combined gauge and signaling unit may be summarized as follows:

The float rod is passed through the vent opening followed by the supporting rod until the threads 16 engage the threads on the tank. At this point, the float rod will have assumed a position as determined by the liquid level. The housing 12 is then rotated, screwing the threads together. As the end of the float rod engages one side of the tank, the supporting rod will be deflected toward the opposite side an amount sufficient to permit the float rod to continue its movement along the tank side until it is clear thereof. Continued rotation of the housing 12 will bring the float rod into successive engagements with the tank sides until the housing reaches final position as shown in Fig. 2.

During filling of the tank, the displaced gas passes to the vent pipe through intrusion tube 30 and whistle 32 to produce a continuous audible signal. As the filling proceeds, the float 46 will rise with the rising liquid level to give a simultaneous visible indication, through the gauge housing 72, of the level in the tank. When the liquid finally reaches the lower end of intrusion tube 30 to cut off the flow of gas therethrough, the audible signal will be cut off or modified to such a degree that the operator even though unable to see the position of the gauge will be advised that the level has at least reached the lower end of the intrusion tube and that the supply should now be cut off.

Hole 32 through the side of intrusion tube 30 provides for continued flow of gas through the upper part of the tube and the whistle after the lower end of the intrusion tube has been trapped by rising liquid. Such flow will not produce a whistling sound as the gas reaches the whistle in a distorted and disturbed condition that destroys the normal resonance of the whistle.

Should the operator fail to cut off the liquid supply in time so that overflow occurs, the whistle body will be forced upwardly from seat 18 to a position against the cross bar 76 at which position the passage through and around the whistle is substantially equal to the venting capacity of vent pipe 10. Thus, under high gas pressure or emergency overflow conditions, the whistle unit causes no undue restriction of venting.

While a preferred form of the invention has been shown and described, it is not intended that the invention is to be limited thereby but only by the appended claims.

I claim:

1. A gauging unit for use with a tank comprising a housing screw threaded for connection with the tank top, a passage through said housing, a supporting rod depending from and fixed against rotation with respect to said housing, a float rod with a float thereon pivotally related to said supporting rod, an indicating rod pivotally related to said float rod and extending upwardly through said housing, said supporting rod including as a part thereof a tightly coiled spring so that it will be deflected laterally when said housing is rotated to cause corresponding rotation of sáid supporting rod and said float rod and the end of said float rod is engaged at an angle by a vertical surface.

2. A gauging unit for use with a tank comprising a housing screw threaded for connection with the tank top, a passage through said housing, a supporting rod depending from and fixed against rotation with respect to said housing, a float rod with a float thereon pivotally related to said supporting rod, an indicating rod pivotally related to said float rod and extending upwardly through said housing, said supporting rod and indicating rod both being sufficiently flexible laterally and said supporting rod being sufficiently resistant to torsional forces so that said supporting rod and indicating rod will be deflected laterally when said housing is rotated to cause corresponding rotation of said supporting rod and said float rod, and the end of said float rod is engaged at an angle by a vertical surface.

3. A gauging unit for use with a tank comprising a tubular housing having a screw threaded extension for connection with the tank top, the passage through said extension being non-concentric to provide a thickened wall on one side of said extension, a supporting rod depending from and fixed against rotation with respect to the thickened wall, a float rod pivotally related to said supporting rod, an indicating rod pivotally related to said float rod and extending upwardly through an opening in said thickened wall, said supporting rod being sufficiently flexible to be bent laterally until in engagement with the side of the tank with which it will be used without exceeding the elastic limit of said supporting rod.

ALCIDE EDWARD MATHEY.

REFERENCES CITED

The following references are of record in the file of this patent:

UNITED STATES PATENTS

| Number | Name | Date |
|---|---|---|
| 2,316,377 | Wilhelm | Apr. 13, 1943 |

FOREIGN PATENTS

| Number | Country | Date |
|---|---|---|
| 6,805 | Great Britain | 1904 |
| 27,970 | France | June 24, 1924 |
| | (Addition to No. 566,328) | |
| 628,151 | France | June 21, 1927 |